(12) United States Patent
Day

(10) Patent No.: US 7,403,605 B1
(45) Date of Patent: Jul. 22, 2008

(54) SYSTEM AND METHOD FOR LOCAL REPLACEMENT OF MUSIC-ON-HOLD

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 959 days.

(21) Appl. No.: 10/862,927

(22) Filed: Jun. 8, 2004

(51) Int. Cl.
*H04M 1/00* (2006.01)
*H04M 3/42* (2006.01)

(52) U.S. Cl. .............. 379/162; 379/215.01; 379/201.01

(58) Field of Classification Search ............... 379/76, 379/88.13, 88.17, 88.22, 88.23, 88.24, 88.25, 379/93.21, 100.11, 102.03, 120, 157–158, 379/162, 201.01, 205.01, 208.01, 215.01, 379/265.09
See application file for complete search history.

(56) References Cited

U.S. PATENT DOCUMENTS

| 6,301,354 | B1 | 10/2001 | Walker et al. |
| 2002/0136384 | A1* | 9/2002 | McCormack et al. .. 379/215.01 |
| 2007/0038443 | A1* | 2/2007 | Thyssen et al. ............. 704/233 |

* cited by examiner

*Primary Examiner*—Binh K Tieu
(74) *Attorney, Agent, or Firm*—Trellis Intellectual Property Law Group, PC

(57) ABSTRACT

A system and method provide for transferring remote media from a remote media source to a communication or other end device at a time prior to a hold period, which media is usable as local MOH media during a hold period. A system and method further provide for responding to an initiated hold time by replacing remote MOH media with the local MOH media if remote MOH media is received in conjunction with the hold period.

23 Claims, 7 Drawing Sheets

SYSTEM AND METHOD FOR LOCAL REPLACEMENT OF MUSIC-ON-HOLD

BACKGROUND OF THE INVENTION

1. Field of Invention

The present invention relates in general to the field of telephony. More specifically, embodiments of the present invention relate to systems and methods for providing media such as music-on-hold.

2. Description of the Background Art

Telephony interactions frequently include a party invoking a hold feature to place at least one other party on hold during the interaction, and often for an extended period of time. Placing a party on hold using earlier analog telephone systems interrupted the audio (voice) connection between the parties, exposing the holding party to an often long and monotonous period of silence. Modern music-on-hold systems, however, replace the silence with one of a hold tone, music or a generalized hold-initiator service message.

Current music-on-hold (MOH) systems provide, within a communication system, for a hold-initiator device, a hold-initiator PBX server or intermediary network MOH service to stream a fixed audio signal via a satellite, a computer, a PSTN, cellular or other network to the holding-party device during a hold period. The hold period is initiated by the MOH service detecting that a hold-initiating party has placed a receiving party on hold, and ends in response to the MOH service detecting that the hold-initiating party has terminated the hold feature. Upon termination, the MOH system returns the holding party to the telephony interaction, e.g., by re-initiating the voice connection or otherwise providing for continuing the exchange of voice audio signals of the parties that was interrupted by the hold period.

Unfortunately, current MOH systems provide either low-quality MOH audio, rendering the MOH audio unpleasant to the listener, or with newer systems, higher quality MOH audio than can be utilized by a receiving device. Current MOH also utilizes processing and network resources for providing the MOH audio during the telephony interaction, which resources might otherwise be available for other purposes. Furthermore, most MOH systems present a fixed one-size-fits all type music selections, such as so-called "elevator music" that is not desirable to many on-hold users. MOH has thus come to be considered an annoyance rather than a technological advance, resulting in further products targeted at either silencing the MOH audio (as with earlier analog systems) or attempting to select and stream higher quality audio from the MOH service to the holding-party device during the hold period. Accordingly, there is a need for systems and methods that provide for MOH while avoiding the problems encountered with existing communication systems employing MOH.

SUMMARY OF EMBODIMENTS OF THE INVENTION

Embodiments of the present invention provide a system and method that enable presenting of music-on-hold (MOH) media while avoiding problems encountered with prior MOH-enabled systems. Embodiments of the invention further provide a system and method that enable selectable remote media to be transferred from a remote media source to a communication or other end device at a time prior to a hold period, which media is usable as MOH media during a hold period. Embodiments also provide a system and method that are capable of responding to an initiated hold time by presenting local MOH media, or further, of replacing remote MOH media with the local MOH media if remote MOH media is received. Embodiments further provide for responding to an end-of-hold condition by returning to a telephony interaction that has been interrupted by the hold period. While local MOH media is preferably stored by a communication device in one embodiment, other embodiments of the invention provide for local media that is stored, loaded onto locally streamed to and/or otherwise locally provided as MOH media to a communication device that might be placed on hold.

A method according to an embodiment of the invention provides for receiving a request for a media transfer, determining a presenting of the received media as music-on-hold (MOH) media, initiating transferring of the media, and storing the media such that the media is usable as MOH media during a MOH period.

A further method according to an embodiment of the invention provides for detecting a music-on-hold (MOH) start condition during a telephony interaction, suppressing presenting of remote MOH media, if any remote MOH media is received, and presenting local music-on-hold media, thereby enabling received remote MOH media, if any, to be replaced by the local MOH media, irregardless of remote MOH media quality, or further, unconditionally. The MOH start condition, in one embodiment, includes one or more of receiving a hold initiation indicator and receiving remote MOH media. The method further includes, in one embodiment, detecting a MOH end condition and causing the telephony interaction to continue.

A still further method according to an embodiment of the invention provides for detecting a music-on-hold (MOH) condition during a telephony interaction, replacing any remote MOH media that might be received with local MOH media unless an override condition is determined indicating that the remote MOH media is to override the local MOH media, and presenting the remote MOH media if the override condition is determined to exist. The override condition, in one embodiment, includes receiving an override indicator from a remote MOH media source.

A system according to an embodiment of the invention includes a media engine for transferring media-on-hold (MOH) media to a communication device, and a replacement engine for detecting a media-on-hold condition and for presenting locally stored media during the MOH condition, the locally stored media replacing remote MOH media if remote MOH media is received by the communication device. The MOH condition, in one embodiment, includes receiving at least one indicator indicating a MOH period.

A further system according to an embodiment of the invention includes a music-on-hold (MOH) detector for detecting a MOH condition, a local MOH media to be presented to a user during a hold period as a replacement MOH media for any remote MOH media that might be received, and a local MOH media overrider for causing presenting of the remote MOH media to the user to override presenting the local MOH media to the user.

Advantageously, embodiments of the invention enable music-on-hold (MOH) to be exploited as an opportunity to present a higher quality of MOH media or a quality consistent with the capabilities of a user communication device. Embodiments of the invention further enable the presenting a richer palate of media that can be rendered selectable by a holding communication device user or overridden by sufficiently important or otherwise media of a hold-imitating user or intermediary that a user or intermediary determines to be more preferably presented. Embodiments of the invention also enable MOH media to be transferred to a communication or other device at a time other than during a telephony interaction, or further, to be transferred in a not real-time or piecemeal manner that can still further be conducted in accordance with available computing, network or other resources.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

Figure 1:
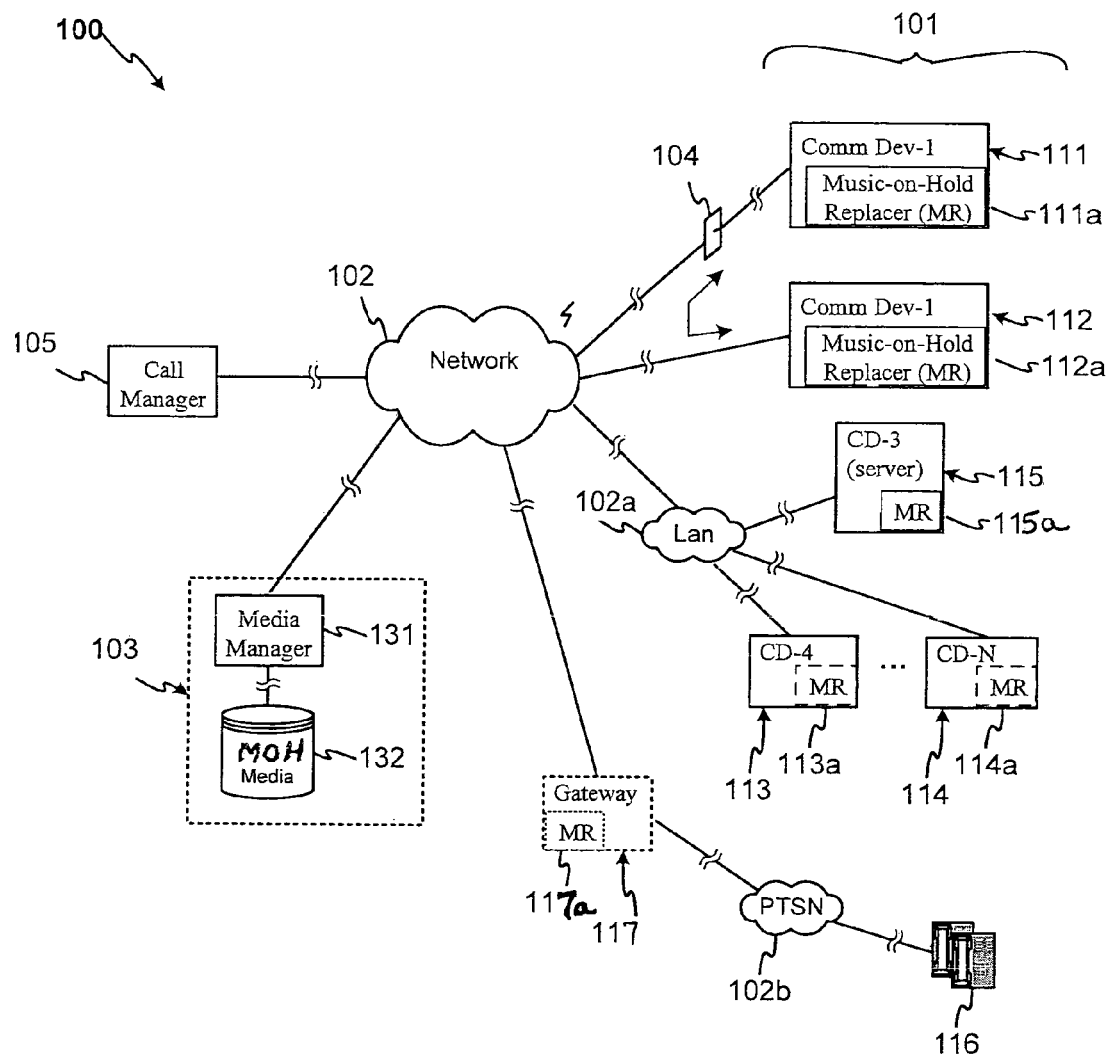
FIG. 1 is a flow diagram illustrating a music-on-hold (MOH) system according to an embodiment of the invention.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, settop box or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Referring now to FIG. 1, there is seen a flow diagram illustrating a music-on-hold (MOH) enabled communication system 100 according to an embodiment of the invention. System 100 broadly provides, in one embodiment, for a communication device 101 to receive media from a remote media source 103 via a suitable network prior to a hold period, and for rendering the transferred media available for presenting to a local user as local MOH media during a hold period. In a further embodiment, system 100 provides for detecting a hold condition indicating a that a remote user is/has interrupted a communication interaction by placing at least the local music-on-hold replacer (MR) user on hold and thereby initiating a hold period. The MR system also provides for pre-senting selectable local MOH media to a user, or further, replacing with local MOH media remote MOH media that might be received in conjunction with a hold period, and presenting the local MOH media to the user during the hold period. System 100 still further provides, in another embodiment, for detecting an overriding condition, overriding replacing of remote MOH media with local MOH media, and presenting remote MOH media to a communication device user during a hold period, among still further embodiments.

System 100 is further configurable for providing a wide variety of MOH media to be used in conjunction with a wide variety of user interactions that are interruptible by at least one interacting users in accordance with the requirements of a particular application. MOH media can, for example, include integral or compiled recordings, sequences, or other audio (e.g., MIDI, speech synthesis, and so on), video, two or three dimensional graphics (e.g., text, imagery, talking head or other animation, and so on), controls, other types of media, or combinations thereof. Media can further be communicated from a remote media source (or by an MR) as at least one identifier identifying a source of media that can be locally conveyed, such as locally couplable radio, TV, one or more network locations, and so on, or some combination. The media can still further convey a wide variety of information, including but not limited to entertainment, business, message, education, web page including dynamically-updated web page, an interactive video game or simulation, other information, or some combination.

Communication interactions can, for example, include but are not limited to video conferencing, remote education, remote computer system interface sharing and other types of communication or combinations thereof that can employ an interruption (i.e. "hold") feature during which MOH media is provided by system 100 to at least one MR user. System 100 is configurable for enabling all, some or only one user to place one or more users (or groups thereof) on hold or to provide local MOH media to all, none or some users in accordance with the requirements of a particular application. A conventional phone call type telephony application might, for example, include enabling all users to place all other users on hold and for presenting local MOH media to all holding users by providing each with an enabled hold feature and MR respectively. A conferencing application might, for example, include providing only a subset of users with an enabled hold feature, for the hold feature to place only a (selectable) subset of other users on hold, or further, to provide an MR that causes local MOH media to be presented to all, none or some portion of holding users. A remote education application might, for example, include providing an enabled hold feature to only a proctor (or assistant), for the hold feature to place only a (selectable) subset of other users on hold, or further, to provide an MR that enables presenting local MOH media to all other users (e.g., students) among numerous other applications. However, while not intended to be construed as limiting, a telephony interaction or "phone call" during which MOH media including music, a message or other audio is provided will be used as a consistent example so that embodiments of the present invention might be better understood.

It is to be understood that the term "or" as used herein is intended to include "and/or" unless otherwise indicated or unless the context clearly dictates otherwise. The term "portion" as used herein is further intended to include "in whole or contiguous or non-contiguous part" which part can include zero or more portion members, unless otherwise indicated or unless the context clearly dictates otherwise.

Communication system 100 includes at least intermittently communicatingly coupled components comprising communication devices 101, network 102, public switched telephone network (PTSN) 102b, music-on-hold service 103 and call manager 105. Firewall 104 further illustrates how suitable firewall, anti-spoofing, fire zone or other types of security mechanisms can also be used in an otherwise conventional manner in conjunction with one or more of system 100 components, in accordance with the requirements of a particular application. Various other components can also be used including but are not limited to, routers, gateways, backup/restore systems, network configuration/reconfiguration, and so on, in accordance with the requirements of a particular application. Such components are well known and are not shown so as not to obscure aspects of the present invention.

Communication devices 101 broadly provide, in the current embodiment, for users to conduct (i.e., initiate or otherwise participate in) telephony interactions, for at least potentially hold-initiating users (or simply "hold-initiating users") to implement a hold feature, and for at least potentially holding-users (or simply "holding-users") to receive and store media usable as MOH media and implement MOH according to embodiments of the invention. As was previously noted, however, other embodiments can also similarly provide for conducting a wide variety of communication interactions that can utilize a wide variety of media in conjunction with interacting, MOH or both. It will also be appreciated that intermediary devices might also be used in conjunction with one or more of the above aspects, e.g., using private branch exchange or "PBX" devices for implementing MOH in conjunction with an analog telephone.

Communication devices 101 can therefore comprise a wide variety of wired or wirelessly coupled devices that are capable of conducting a communication interaction, at least one of which provides an interaction interrupt ("hold") feature and at least one of which provides for MOH according to an embodiment of the invention. More preferably, all or at least all computer-based devices provide for communication, a hold feature and the MOH, or further, the hold feature or MOH are capable of being locally or remotely disabled or enabled. Such communication devices can, for example, include but are not limited to one or more of conventional cell phones, internet phones, telephony equipped personal data managers (PDAs), laptop/desktop computers, set-top boxes or other computers (e.g., 111, 112) to which MOH functionality according to the invention has been added. Communication devices 101 can also include analog devices including but not limited to analog telephones (e.g., 116). It will become apparent that a hold feature, a MOH according to embodiments of the invention, or both, can also be implemented using a substantially local PBX, conferencing/education or other intermediary device, e.g., such as was already discussed.

Within communication devices 101, a conventional communications interface (not shown) can be used in an otherwise conventional manner for conducting transfer of interaction media in accordance with a particular application (e.g., transferring user voice media in conjunction with a telephony interaction, transferring voice, graphic or video media in conjunction with video conferencing, and so on). For example, in an embodiment employing an IP protocol (e.g., where network 102 includes the Internet), standard analog telephones 116 can communicate standard telephony signals through public switched telephone network (PSTN) 102b to gateway 117. Gateway 117 can then encapsulate the standard telephony signals as real-time transport protocol (RTP) packets for transmission over network 102 to receiving ones of communication devices 101. Received packets can then be converted to voice signals in the present embodiment (or video, graphic or other media or some combination in other embodiments) in a conventional manner in accordance with a particular application. Contrastingly, communication devices comprising computers (e.g., see above) can, for example, operate as internet protocol (IP) endpoints and directly perform digitizing/packetizing prior to transmission as well as conversion and presenting of received packets to a user. It will be appreciated that other networks or network protocols can also be used in accordance with a particular application.

Substantially all telephony devices further incorporate a hold feature that cause the transfer of voice signals between interacting communication devices to be terminated during a hold period. Telephony device hold features (or intermediary devices) can also provide, in one embodiment, for transmitting hold-initiate and hold-terminate indicators such as those currently provided by conventional MOH systems (e.g., see below). In another embodiment, telephony devices can provide for transmitting a source identifier identifying the or holding-device identifiers identifying selected devices or groups of devices to be placed on hold, for example, in a similar manner as with other conventional network communication, which identifier(s) can be received via network 102 by call manager 105 or other interacting communication devices. In yet another embodiment, a locally or remotely initiated disabler can be provided in a conventional manner for enabling/disabling one or more of the hold features (e.g., see above) or source/holding-device identifiers. It will be appreciated that one or more of interaction interruption or "hold" features, source/holding-device identifiers or enablers can also be provided in conjunction with other communication devices or other media, for example, in substantially the same manner or otherwise in accordance with the requirements of a particular application.

At least one of communication devices 101 of the present embodiment also includes a music-on-hold replacer (MR). Preferably, an MR is provided for each of communication devices 101 either directly (e.g., 111a, 112a and optionally 113a, 114a) or via a local intermediary device (e.g., 115a, 117a). In the case of analog telephones 116, for example, MR 117a is implemented by gateway 117. Communication device 115 provides a further example in which a local server can implement an MR 115a servicing corresponding local devices 113, 114 via a local network 102a, each communication device can directly implement an MR, or both. A dual intermediary and end device implementation enables an advantage in embodiments employing the above-discussed override, for example, enabling important media of an employer or household, a remote company or both to override replacement of remote MOH media with local MOH media stored or otherwise accessible to a communication device of a holding-user. Local MOH media is not acquired over the network but via a purely local process, such as one or more of CD player, MP3 recorder, DVD player, barcode reader, etc. in the local device.

Each MR provides for enabling a corresponding communication device user to select media for use as MOH media, and to receive and store the media as local MOH media. In the present embodiment, an MR determines resources of a local device (e.g., remaining memory size, data handling, processing resources, and so on) in an otherwise conventional manner for determining such resources and initiates a request via network 102 to media service 103 for an indicator of corresponding available media. The MR further receives the indicator from media service 103 via network 102 and presents the list to the user. Upon user selection of media, the MR requests from media service 103 the selected media and stores the media as MOH media. In a particular embodiment, the MR can further similarly provide for user selection of MOH media presentation, for example, to enable or disable presentation, select one or more of the MOH media for presenting linearly, cyclically, randomly, and so on, alone or in combination with other media, or in conjunction with a particular application (e.g., phone call, conference call, video conference and so on), user or other criteria. While transfer of the entire media might be conducted using real-time IP packets, an advantage enabled by receiving media prior to a hold period is that media usable as MOH media during a hold period can be transferred in non real-time, or "trickled" in accordance with available network resources or other factors. It will be appreciated that media can also be received from communication devices or other media sources in substantially the same manner.

Each MR also provides for detecting a hold period, presenting the local MOH media during the hold period, and for implementing the aforementioned override feature in embodiments in which the override is implemented. While an MR might conduct a direct monitoring of hold or other conditions of other communication devices, e.g., in substantially the same manner as existing MOH systems, embodiments of the present invention also enable a backward compatibility with existing MOH systems.

The present MR embodiment more specifically receives from an existing MOH system (depicted as call manager 105) one or more indicators corresponding to a current hold period. Each MR is configurable for receiving various indicators that are currently utilized, including but not limited to a hold-initiation and hold-termination indicator pair (indicating respectively the start and end of a hold period) or receipt of a wave file, a media stream or other media. The MR responds by determining a hold period corresponding to the indicators or media respectively as hold-initiation and termination or a hold-initiation corresponding to the start of receipt of the media and a hold-termination corresponding to the end of receipt of the media.

In one embodiment, the MR responds by determining a current local MOH media for presenting (e.g., see above) and initiating presenting of the current local MOH media to the user. In another embodiment, the MR further responds to receipt of a hold-initiating device, application, user, holding-device or other identifier(s) by determining whether to initiate a hold period, and if so, initiates presenting the current local MOH media to the user. In a further embodiment, the MR responds to an override indicator by overriding replacing of remote MOH media with local MOH media and instead presenting received remote MOH media to the user.

The MR further, in embodiments implementing remote enabling/disabling, responds to receiving an enabling or disabling indicator by respectively enabling or disabling a corresponding hold, MOH or other feature of the corresponding communication device (or intermediary device). In other embodiments supporting local enabling/disabling, the MR provides an optionally password or otherwise protected user interface for user enabling/disabling selection and responds to receiving an enabling or disabling indicator by respectively enabling or disabling a corresponding hold, MOH or other feature of the corresponding communication device (or intermediary device).

It will be appreciated that one or more of the above call manager, communication device or MR embodiments/features can also be used in combination.

Networks 102 and 102a can include one or more statically or dynamically configurable wired or wireless networks that can also include so-called virtual networks for providing at least intermittent communication between devices. Network 102 couples interacting ones of communication devices 101, media service 103 and, in the present backward compatible environment, call manager 105, while network 102a couples server 115 with network 102 and communication devices 113 and 114. In the present embodiment, network 102 comprises a wide area network or "WAN" and more preferably the Internet, while network 102a comprises a local area network or "LAN". It will be appreciated, however, that other networks or communication protocols can also be used in accordance with a particular application.

Media service 103 provides for storing media useable by communication devices 101 as local MOH media. Operationally, media manager 131 responds to a media ID request from a communication device by polling media 132 for media indicators of media corresponding to the request. The request can, in one embodiment, indicate a media type, size, quality, compression or other factors in accordance with the requirements of a particular application. Media manager 131 further responds to a media request from a communication device by retrieving the media from media storage 132 and initiating transfer of the media via network 102 to the requesting communication device.

Call manager 105 provides an example of a prior MOH system that can be used in conjunction with system 100.

When included, call manager 105 can operate in a conventional manner to monitor a hold status of communication devices 101 and provide a hold status indicator indicating when a communication device initiates/terminates a hold period. As noted above, the hold status indicator can include one or more indicators indicating such status directly or by transferring MOH media during a hold period. A hold status indicator can further, in one embodiment, indicate a hold-initiating communication device or holding-user communication devices to be affected by the hold, thereby enabling identifiable ones (or groups) of communication devices to be placed on hold or for which MOH media is to be applied. It will be appreciated, however, that one or more of the indicators provided by call manager 105 can also be provided by a hold-initiating communication device or by some intermediary device.

Call manager 105 further, in one embodiment, responds to a hold status of a communication device or otherwise provides an override indicator indicating that MOH media provided by call manager 105 during a subsequent hold period is sufficiently important that replacing of the MOH media by local MOH media is to be avoided. As noted above, an MR of a communication device responds to the override indicator, in one embodiment, by avoiding replacing of the call manager (or "remote") MOH media with local MOH media already available to the communication device.

Figure 2:
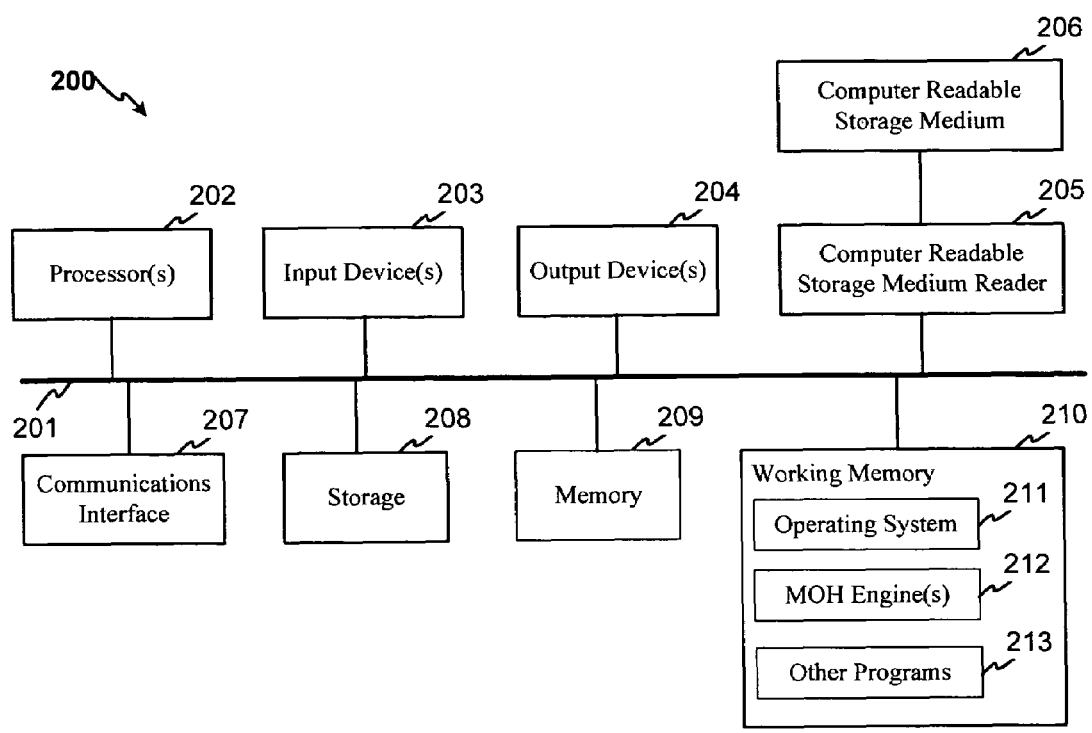
FIG. 2 is a schematic diagram illustrating a computer system which is capable of conducting MOH according to an embodiment of the invention.

Referring now to FIG. 2, an exemplary computing system is illustrated that can comprise one or more of the components of FIG. 1. While other alternatives might be utilized, it will be presumed for clarity sake that components of the systems of FIG. 1 and elsewhere herein are implemented in hardware, software or some combination by one or more computing systems consistent therewith, unless otherwise indicated.

Computing system 200 comprises components coupled via one or more communication channels (e.g. bus 201) including one or more general or special purpose processors 202, such as a Pentium®, Centrino®, Power PC®, digital signal processor ("DSP"), and so on. System 200 elements also include one or more input devices 203 (such as a mouse, keyboard, microphone, pen, and so on), and one or more output devices 204, such as a suitable display, speakers, actuators, and so on, in accordance with a particular application.

System 200 also includes a computer readable storage media reader 205 coupled to a computer readable storage medium 206, such as a storage/memory device or hard or removable storage/memory media; such devices or media are further indicated separately as storage 208 and memory 209, which can include hard disk variants, floppy/compact disk variants, digital versatile disk ("DVD") variants, smart cards, partially or fully hardened removable media, read only memory, random access memory, cache memory, and so on, in accordance with the requirements of a particular application. One or more suitable communication interfaces 207 can also be included, such as a modem, DSL, infrared, RF or other suitable transceiver, and so on for providing inter-device communication directly or via one or more suitable private or public networks or other components that can include but are not limited to those already discussed.

Working memory 210 further includes operating system ("OS") 211 elements, MOH engines including, for example, media manager 103, call manager 105, MOH replacer 111a or 112a or gateway 115a, of FIG. 1, as well as other programs 214 that might be used. Working memory components can also include one or more of application programs, mobile code, data, and so on for implementing system 100 elements that might be stored or loaded therein during use. The particular OS can vary in accordance with a particular device, features or other aspects in accordance with a particular application (e.g. Windows, WindowsCE, Mac, Linux, Unix or Palm OS variants, a cell phone OS, a proprietary OS, and so on). Various programming languages or other tools can also be utilized, such as those compatible with C variants (e.g., C++, C#), the Java 2 Platform, Enterprise Edition ("J2EE") or other programming languages in accordance with the requirements of a particular application. Such working memory components can, for example, include one or more of applications, add-ons, applets, custom software and so on for conducting but not limited to the examples discussed elsewhere herein. Other programs 214 can, for example, include one or more of the aforementioned security, compression, synchronization, backup systems, Web browsers, conferencing programs, education programs, groupware code, and so on, including but not limited to those discussed elsewhere herein.

When implemented in software (e.g. as an application program, object, agent, downloadable, servlet, and so on in whole or part), an MOH-enhanced communication system or other component can be communicated transitionally or more persistently from local or remote storage to memory (SRAM, cache memory, etc.) for execution, or another suitable mechanism can be utilized, and elements can be implemented in compiled or interpretive form. Input, intermediate or resulting data or functional elements can further reside more transitionally or more persistently in a storage media, cache or other volatile or non-volatile memory, (e.g., storage device 208 or memory 209) in accordance with a particular application.

Figure 3A:
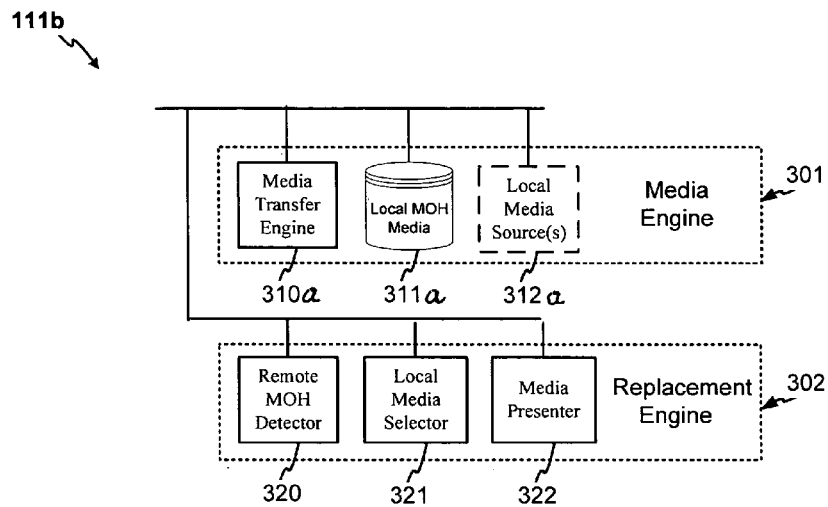
FIG. 3A is a flow diagram illustrating the MOH replacer of FIG. 1 in greater detail, according to an embodiment of the invention.
Figure 3B:
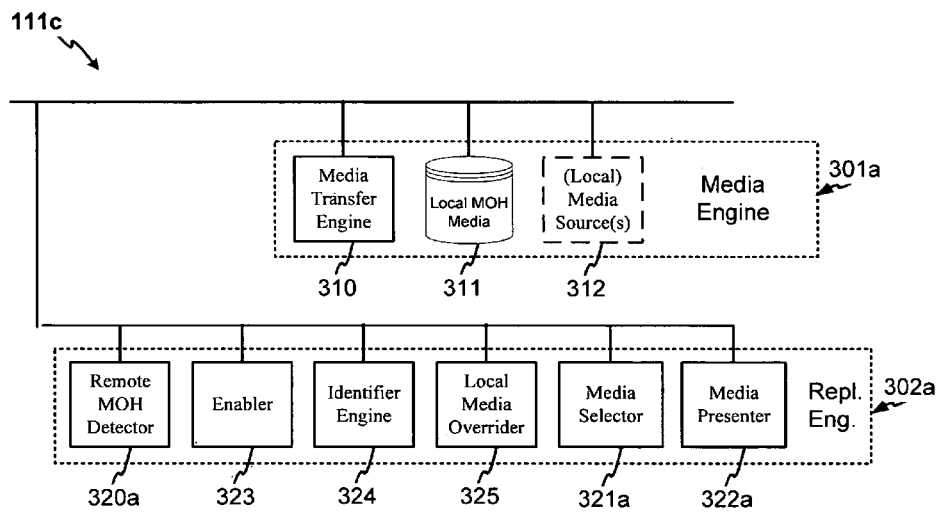
FIG. 3B is a flow diagram illustrating a further MOH replacer according to an embodiment of the invention.

Referring now to FIGS. 3A and 3B, there are seen flow diagrams illustrating, in greater detail, music-on-hold replacer (MR) embodiments according to the invention. The FIG. 3A MR embodiment provides for receiving and making media available as local MOH media prior to a hold period, and for conducting local replacement of MOH in conjunction with a hold period. The FIG. 3B MR embodiment further provides for conducting such local replacement in conjunction with hold or MOH enabling/disabling, initiator/holding-party identification and overriding replacement of remote MOH with local MOH.

Beginning with FIG. 3A, MR 111b includes media engine 301 and replacement engine 302. Within media engine 301, media transfer engine 310 provides for determining communication device resources and presenting a user with an interface for selecting a media source at which media suitable as local MOH media might be located (e.g., media manager 131 of FIG. 1). Local media source(s) is/are indicated as 312. The media source is predetermined in one embodiment and user-selectable in another embodiment. The interface can, for example, be provided by media transfer engine 310 initiating a Web browser to a corresponding predetermined or user-selectable Web page in another embodiment. As was already discussed, media transfer engine 310 (or an initiated browser) transfers to the media source indicators indicating media type(s), communication device resource information, purchase information (if a fee is charged) or other media criteria in accordance with a particular application. Media transfer engine 310 (or browser) further presents received media titles, descriptions, requirements or other remote media parameters to the user, receives and transfers to the remote source a user selection, and receives the remote media from the remote source, which media transfer engine 310 stores in local MOH media storage 311.

In a particular embodiment, media transfer engine also invokes local media selector 321, which similarly provides for user selection of MOH presentation criteria (e.g., see above) corresponding to the local MOH media, associates the criteria with the local MOH media and stores the criteria and association in local MOH media storage 311. A further embodiment provides for storing default (e.g., factory preset) local MOH media in local MOH media storage, along with associated user-selectable criteria, for presenting to a user, for example, where remote media has not been received or as a default user selection (e.g., see FIG. 3C)

Figure 3C:
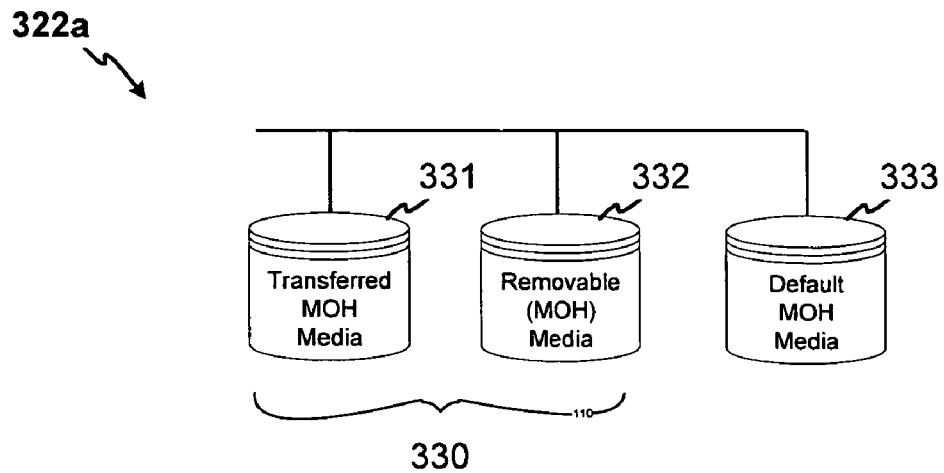
FIG. 3C is a flow diagram illustrating a local MOH media configuration according to an embodiment of the invention.
Figure 3D:
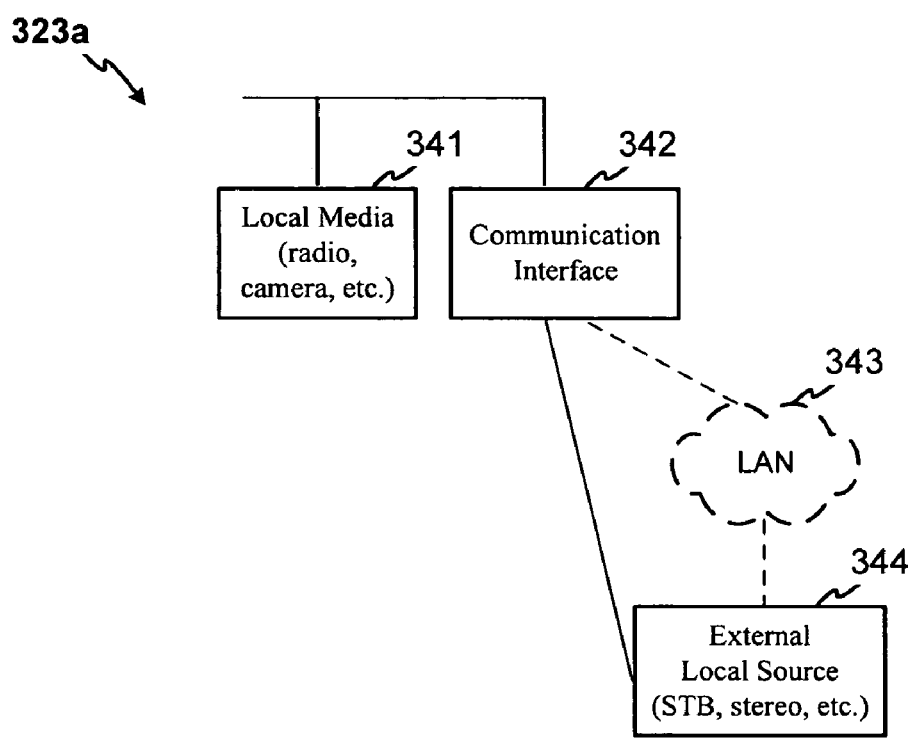
FIG. 3D is a flow diagram illustrating a further local MOH media configuration according to an embodiment of the invention.

In a further particular embodiment, integrated or otherwise wired or wirelessly accessible radio, TV or other local media sources (e.g., via Bluetooth, 802.11x, and so on) are provided (e.g., see FIG. 3D). In such embodiment, media transfer engine 310 similarly provides for user selection and setting of criteria for using the locally accessible media, alone or in conjunction with remotely accessed media, as local MOH media and stores any user criteria in local MOH media storage 311. For example, media transfer engine 310 can also implement controls in an otherwise conventional manner for operating an integral cell phone or PDA radio or a direct or LAN coupled media source that is accessible during a hold period as a local media source, for which media transfer engine can also provide operational, MOH selection or other MOH criteria.

Replacement engine 302 provides for local MOH replacement using local MOH media that is stored or for which parameters or other criteria are stored in local MOH media storage. Replacement engine 302 includes remote MOH detector 320, local media selector 321 and media presenter 322. Remote MOH detector 320 receives one or more hold period indicators (e.g., initiate/terminate or media) and determining that a hold period has been initiated or terminated.

In conjunction with determining a hold-initiation, remote MOH detector 320 initiates local media selector 321 to select MOH media. Local media selector 321 polls local media storage 311 for received local MOH media, default media (e.g., see FIG. 3c) or local media source criteria and initiates media presenter 322, which presents the corresponding local MOH media to the user according to the stored criteria, thereby replacing presenting of any remote MOH media that might be received with presenting of the local MOH media. In a further embodiment, media presenter 322 initiates a corresponding media presentation program of the communication device for presenting the local MOH media rather than presenting the local MOH media directly.

Remote MOH detector 320 further responds to a hold termination indicator by determining that an MOH termination condition exists, initiating media presenter 322 to discontinue presenting the local MOH media and initiating a communication interface of the communication device (not shown) to resume receiving and presenting of the communication interaction. In a further embodiment employing a schedule of local MOH media for presenting, remote MOH detector 320 initiates local media selector 321 to store an indicator indicating the local MOH media that has been presented.

Continuing now with FIG. 3B, MR 111c is configured and operable in a similar manner as with MR 111b of FIG. 3A. As in FIG. 3A, MR 111c includes media engine 301a and replacement engine 302a. Media engine 301a also similarly includes media transfer engine 310a, local MOH media storage 311a and local media sources 312a which components are operable in the same manner as with media engine 301 of FIG. 3A. Replacement engine 302a also similarly includes remote MOH detector 320a, media selector 321a, media presenter 322a that are operable in a similar manner as with similarly numbered components of FIG. 3A. Replacement engine 302a, however, also includes enabler 323, identifier engine 324 and local media overrider 325. FIG. 3C is a flow diagram illustrating a local MOH media configuration according to an embodiment of the invention. FIG. 3D is a flow diagram illustrating a further local MOH media configuration according to an embodiment of the invention.

Enabler 323 provides hold, MOH and override enable/disable features in a corresponding communication device, each of which is configurable for responding to local, remote or local and remote initiation in accordance with a particular application. In a remote initiation configuration, enabler 323 responds to receipt of a remote hold disable indicator, remote MOH disable indicator or remote override disable indicator identifying a communication device corresponding to MR 111c by respectively disabling the hold, MOH or override feature of the communication device, if the feature is not already disabled. Thereafter, the communication device user is incapable respectively of placing interacting users on hold, being presented with MOH media or being presented with remote MOH media that overrides presenting of local MOH media, unless the communication device further receives a corresponding enable indicator. Enabler 323 responds to receipt of a remote hold, MOH or override enable indicator identifying a communication device corresponding to MR 111c respectively by enabling the hold, MOH or override feature of the communication device, if the feature is not already enabled. Thereafter, the communication device user is capable respectively of placing interacting users on hold, being presented with MOH media or being presented with remote MOH media that overrides presenting of local MOH media, unless the communication device further receives a corresponding disable indicator.

In a local initiation configuration, enabler 323 provides for presenting a user with an interface for conducting disabling or enabling of hold, MOH or override features in a corresponding communication device. The interface can, for example, include adding corresponding options to an existing communication device interface in an otherwise conventional manner (e.g., adding menu items) or adding an MR control interface that includes such options (e.g., operating as an add-on, applet or stand-alone program). Enabler 323 otherwise preferably operates in substantially the same manner in a local initiation configuration as with a remote initiation configuration.

Identifier engine 324 provides, in one embodiment, for receiving a hold-initiator identifier, polling local MOH media storage 311a for a corresponding ID and, if a corresponding ID is found, inhibiting the initiating of a hold period. Identifier engine 324 instead provides, in another embodiment, for receiving a holding-party identifier, polling local MOH media storage 311a for the identifier of the corresponding MR, and if a corresponding ID is found, enabling the initiating of a hold period. It will be appreciated that user, communication device or other identifiers can also be utilized, mechanisms other than polling can be used, a suitable storage location can be used, and so on, in accordance with the requirements of a particular application.

Local media overrider 325 provides for avoiding replacing received remote MOH media with local MOH media, such that, unless disabled (e.g., see above), remote MOH media received in conjunction with a hold period, if any, is presented to a user instead of local MOH media. Local media overrider 325 can, for example, be used to present important remote MOH media, if enabled, by one or more of a communication device, local/remote PBX or other intermediary device, or a call manager communicating to the communication device (or a corresponding intermediary device MR) an override indicator and remote MOH media, in accordance with a particular application. Local media overrider 325 is configurable, in one embodiment, for implementing overriding in response to a remote initiation from user-selectable remote devices or from all devices either in response to receipt of all subsequent remote MOH media received in conjunction with a hold period or "globally" (e.g., until a corresponding override ignore indicator is received) or only in conjunction with corresponding remote MOH media received in conjunction with a same or next hold period or "instance based". Local media overrider 325 is further configurable, in another embodiment, for responding to local or remote initiation, preferably in a similar manner as with enabler 323.

Figure 4:
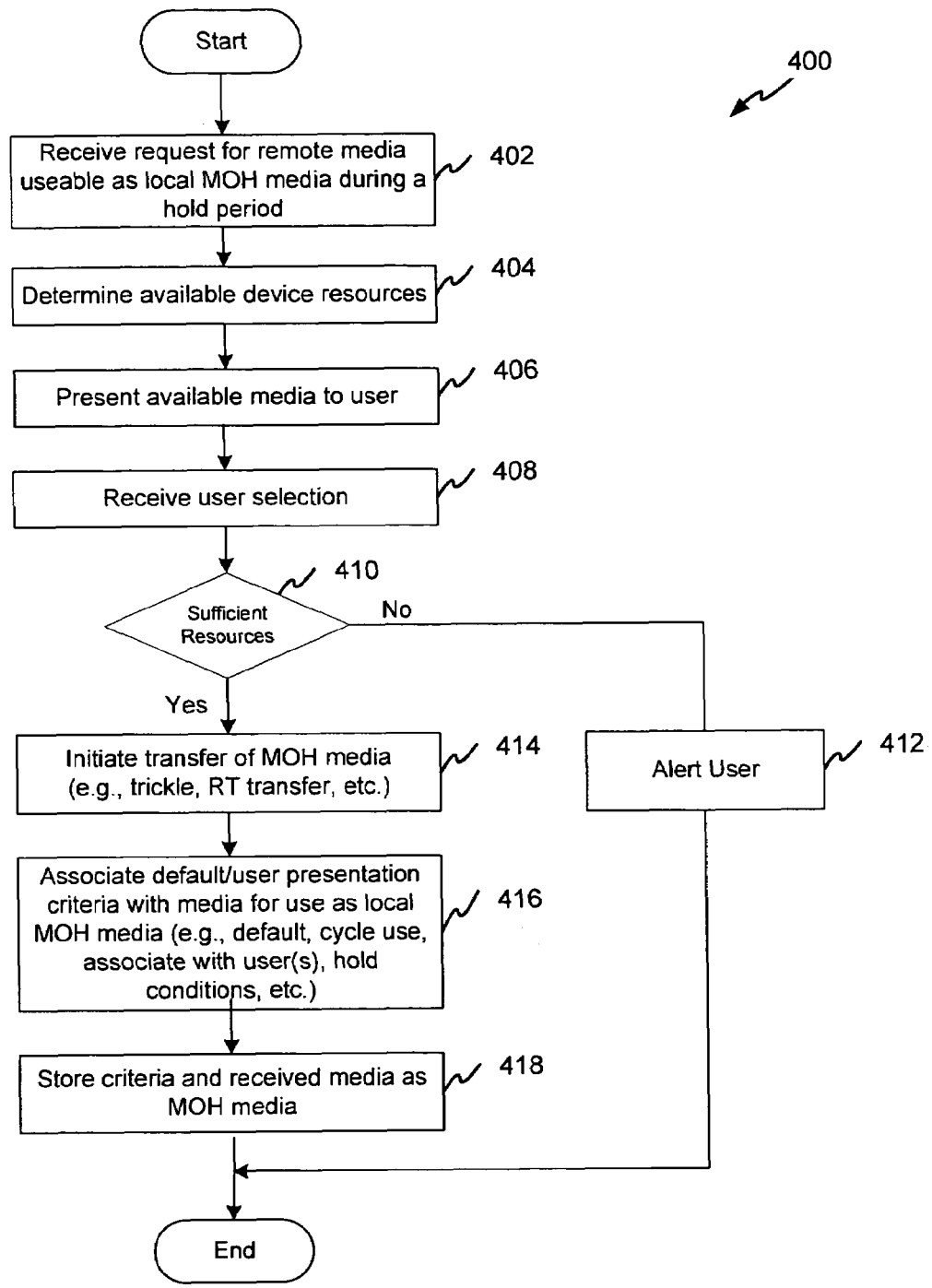
FIG. 4 is a flowchart illustrating a method for providing local MOH media prior to a hold period according to an embodiment of the invention.

The FIG. 4 flow chart illustrates a method for receiving remote media prior to a hold period and rendering the media available as local MOH media in accordance with one embodiment of the present invention. As depicted, in block 402, a media engine receives a request for remote media usable as local MOH media. In block 404, the media engine determines available resources of the communication device corresponding to the media engine. In block 406, the media engine presents available remote media to the user. The media engine can, for example, receive and present to the user indicators of available media from a fixed or user-selectable remote media source. In block 408, the media engine receives from the user a user media selection from among the presented media indicators. In block 410, the media engine determines whether the communication device has sufficient resources for presenting the remote media as MOH media, and if not, alerts the user in block 412. Such determining can, for example, include determining one or more of whether the communication device recognizes and can present the type of media, convert the media if conversion is required, store the amount of media data, conduct processing for presenting the media, or other criteria in accordance with a particular application.

If instead, in block 410, the media engine determines that the communication device includes sufficient resources, then the method continues with block 414. In block 414, the media engine initiates transfer of the remote media prior to a hold period. While such transfer might include real-time media transfer, such transfer is more preferably conducted in not real time, or further, in accordance with available network, remote source or communication device resources. In block 416, the media engine associates presentation criteria with the transferred media for use of the transferred media as local MOH media during a hold period. Such criteria can, for example include at least one of default criteria and user selectable criteria including but not limited to presentation order, processing, hold conditions, user, interaction type, and so on, in accordance with a particular application. It is to be understood that the connection is being used to receive media in real-time but it is not being immediately played out, it is being stored and some earlier part of the same program is being played out from storage. In block 418, the media engine stores the transferred media and presentation criteria as local MOH media.

Figure 5A:
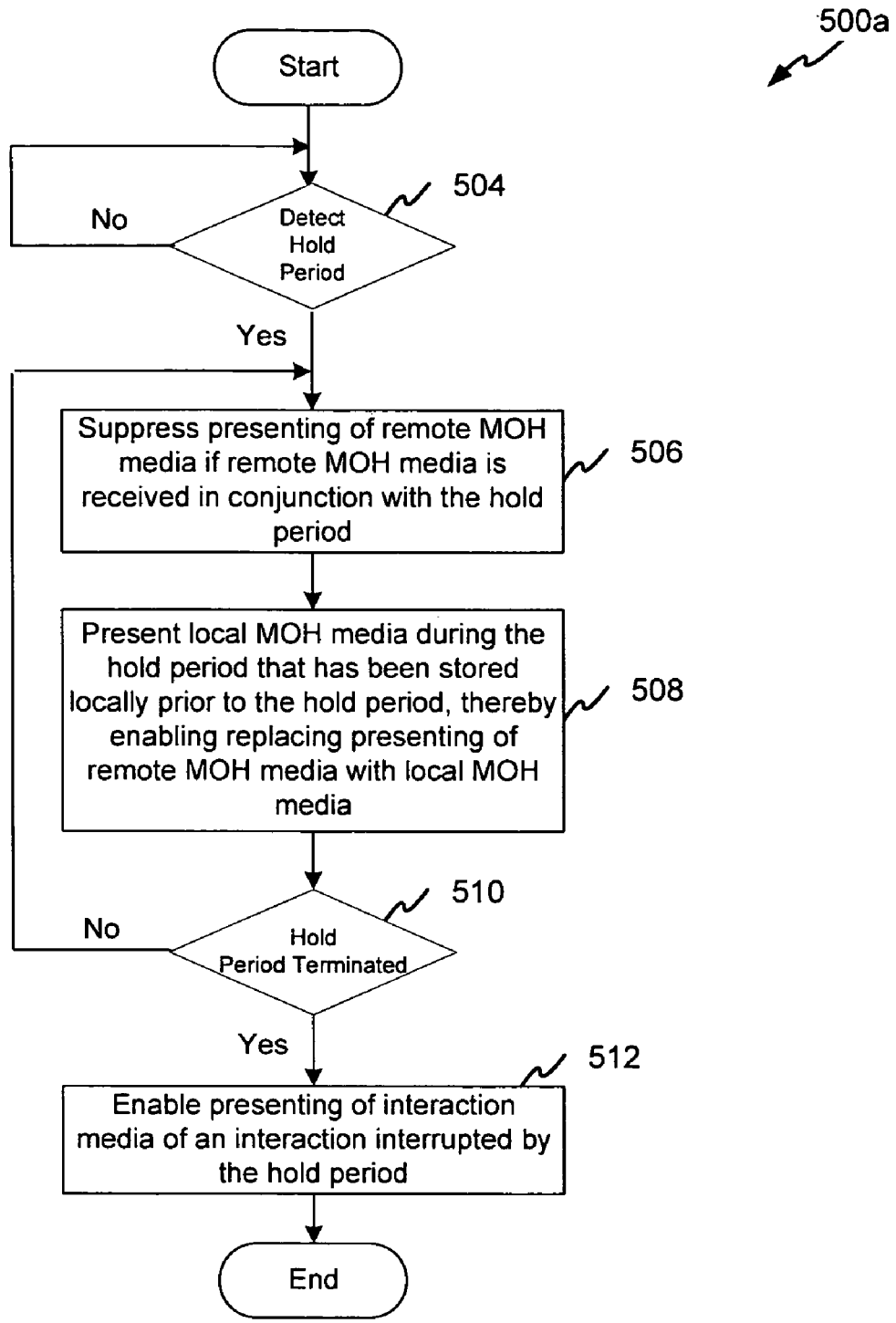
FIG. 5A is a flowchart illustrating a method for local replacement of music-on-hold according to an embodiment of the invention.

The FIG. 5A flowchart illustrates a method for replacing a presenting of remote MOH media received by a communication or intermediary device during a hold period with presenting of local MOH media of the device. As shown, in decision block 504, the device detects whether a hold period is initiated. The hold period can be detected by the device receiving an indicator of a hold period initiation, receipt of MOH media or by any other suitable mechanism in accordance with a particular application. If the device detects a hold period in block 504, then the method continues with block 506. In block 506, the device suppresses presenting of remote MOH media if remote MOH media is received in conjunction with the hold period. As noted above, such remote MOH media is typically received during the hold period if the remote MOH media is received at all (e.g., if another prior or other MOH system is operating to transfer MOH media during the hold period). In block 508, the device presents local MOH media during the hold period that is locally stored prior to the hold period. As noted earlier, such local storage can include media or an indicator of locally available media that is stored internally by the device, including but not limited to media an internal media source, a removable media source or a local external media source coupled to the device during the hold period (e.g., a locally networked media source).

In block 510 the device determines whether the hold period has terminated (e.g., by receiving a hold termination indicator or termination of device receipt of the MOH media). If, in block 510, the device determines that the hold period has not terminated, then the method continues with block 506; otherwise, in block 512, the device enables presenting of interaction media of an interaction interrupted by the hold period.

Figure 5B:
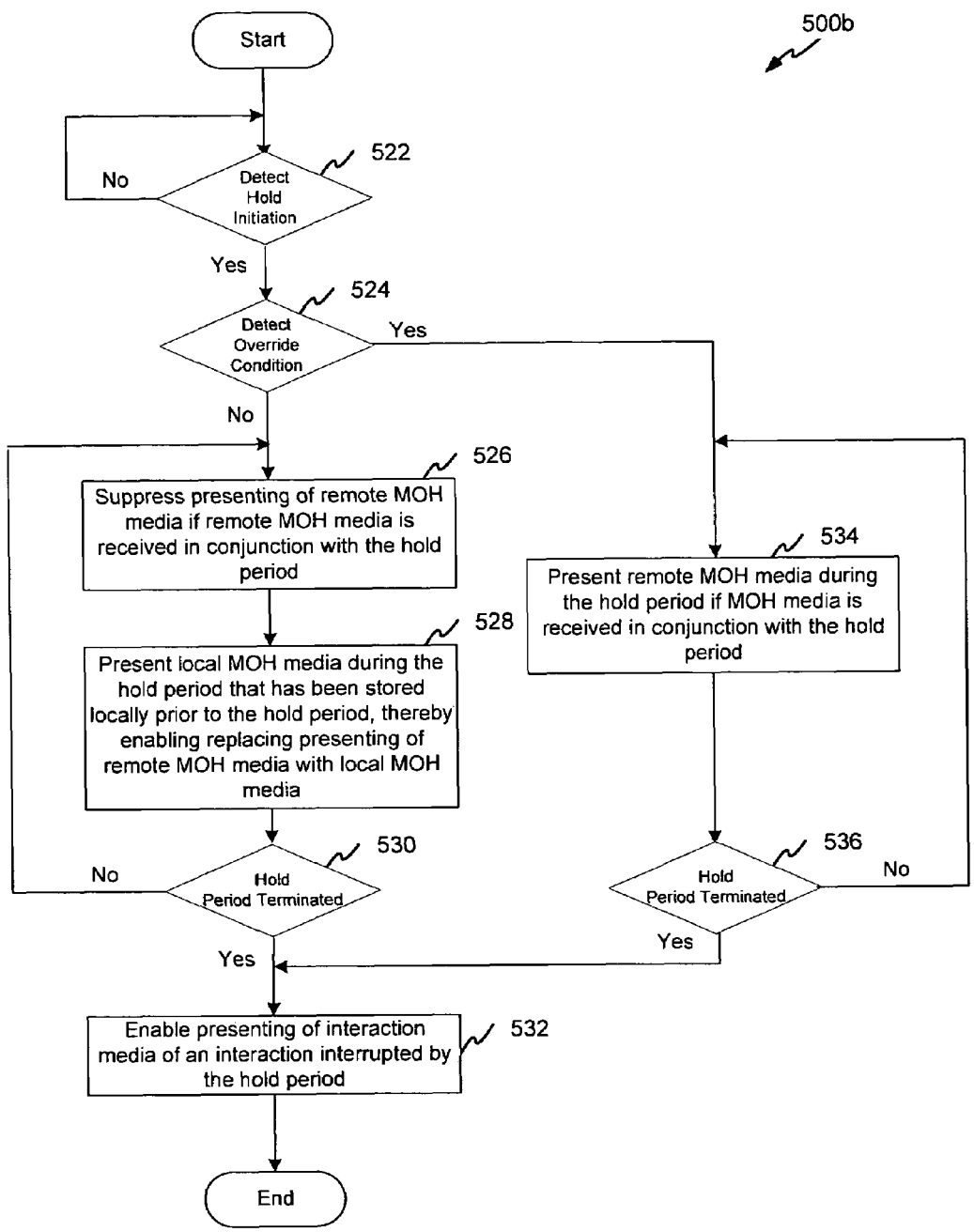
FIG. 5B is a flowchart illustrating a further method for local replacement of music-on-hold according to an embodiment of the invention.

The FIG. 5B flowchart illustrates a further method for replacing a presenting of remote MOH media received by a communication or intermediary device during a hold period with presenting of local MOH media of the device. As shown, in decision block 522, the device detects whether a hold period is initiated. If the device detects a hold period in block 522, then the method continues with block 524. In decision block 524, the device determines whether a remote MOH replacement override condition exists, for example, by receiving an override indicator from a hold-initiating communication device or an intermediary device corresponding to the hold-initiating communication device.

If the device determines in block 524 that a replacement override condition does not exist, then the method continues with block 526 in a similar manner as with method of FIG. 5A. In block 526, the device suppresses presenting of remote MOH media if remote MOH media is received in conjunction with the hold period. In block 528, the device presents local MOH media during the hold period that is locally stored prior to the hold period. In block 530, the device determines whether the hold period has terminated. If, in block 530, the device determines that the hold period has not terminated, then the method continues with block 526; otherwise, in block 532, the device enables presenting of interaction media of an interaction interrupted by the hold period.

If instead the device determines in block 524 that a replacement override condition does exist, then the method continues with block 534. In block 534, the device presents remote MOH media during the hold period if MOH media is received in conjunction with the hold period. In block 536, the device determines whether the hold period has terminated. If, in block 536, the device determines that the hold period has not terminated, then the method continues with block 534; otherwise, in block 532, the device enables presenting of interaction media of an interaction interrupted by the hold period.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method, comprising:
   receiving a request for remote media usable as local music-on-hold (MOH) media during a subsequent interruption (hold) period;
   receiving a user media selection;
   receiving remote media data corresponding to the user media selection from a remote media source prior to the hold period;
   associating presentation criteria with the remote media data to form local MOH media; and
   storing the presentation criteria and the local MOH media.

2. A method according to claim 1, wherein the remote media data comprises audio data.

3. A method according to claim 1, further comprising transferring the request for remote media to a remote media source, and receiving from the remote media source at least one indicator indicating available media from the remote media source.

4. A method according to claim 3, wherein the remote media source is user selectable.

5. A method according to claim 3, further comprising determining whether the at least one indicator indicates that sufficient resources exist for further processing of the available media.

6. A method according to claim 1, wherein at least a portion of the receiving remote media is conducted in timeshifting.

7. A method according to claim 1, wherein the presentation criteria includes one or more of a presentation order and presentation attributes.

8. A method according to claim 7, wherein the presentation attributes include presentation volume.

9. A system, comprising:
   means for receiving a request for remote media usable as local music-on-hold (MOH) media during a subsequent hold period;
   means for receiving a user media selection;
   means for receiving remote media corresponding to the user media selection from a remote media source;
   means for associating presentation criteria with the remote media to form local MOH media; and
   means for storing the presentation criteria and the local MOH media.

10. A computer-readable stored device having stored thereon instructions for:
    receiving a request for remote media usable as local music-on-hold (MOH) media during a subsequent hold period;
    receiving a user media selection;
    receiving remote media corresponding to the user media selection from a remote media source;
    associating presentation criteria with the remote media to form local MOH media; and
    storing the presentation criteria and the local MOH media.

11. A method, comprising:
    detecting a hold period during a communication interaction;
    suppressing presenting of remote MOH media if remote MOH media is received in conjunction with the hold period; and
    presenting local MOH media during the hold period, wherein the local MOH media is rendered available prior to the hold period, thereby enabling replacing presenting of the remote MOH media with the locally stored MOH media.

12. A method according to claim 11, further comprising receiving the local MOH media from a remote media source prior to the hold period.

13. A method according to claim 11, wherein the local MOH media is rendered available prior to the hold period by storing the local MOH media on a local communication device prior to the hold period.

14. A method according to claim 11, wherein the local MOH media is rendered available prior to the hold period by identifying a local media source as a source of MOH media to be presented during a hold period.

15. A method according to claim 14, wherein the method is performed by a communication device and the local media source comprises an integrated media source integrated within the communication device.

16. A method according to claim 15, wherein the integrated media source comprises a radio receiver.

17. A method according to claim 14, wherein the method is performed by a communication device and the local media source comprises a media source coupled to the communication device.

18. A method according to claim 11, wherein the method is performed by a telephony device.

19. A system, comprising:
  means for detecting a hold period during a communication interaction;
  means for suppressing presenting of remote MOH media if remote MOH media is received in conjunction with the hold period; and
  means for presenting local MOH media during the hold period, wherein the local MOH media is rendered available prior to the hold period, thereby enabling replacing presenting of the remote MOH media with the locally stored MOH media.

20. A computer-readable stored device having stored thereon instructions for:
  detecting a hold period during a communication interaction;
  suppressing presenting of remote MOH media if remote MOH media is received in conjunction with the hold period; and
  presenting local MOH media during the hold period, wherein the local MOH media is rendered available prior to the hold period, thereby enabling replacing presenting of the remote MOH media with the locally stored MOH media.

21. A method, comprising:
  detecting a hold period during a communication interaction;
  determining whether a replacement override condition exists;
  if a replacement override condition is determined to exist, then
    (a) suppressing presenting of remote MOH media during the hold period if remote MOH media is received in conjunction with the hold period, and
    (b) presenting local MOH media during the hold period, wherein the local MOH media is rendered available prior to the hold period, thereby enabling replacing presenting of the remote MOH media with the locally stored MOH media; and
  if a replacement override condition is determined not to exist, then
    presenting the remote MOH media during the hold period.

22. A system, comprising:
  means for detecting a hold period during a communication interaction;
  means for determining whether a replacement override condition exists;
  means for if a replacement override condition is determined to exist, then
    (a) suppressing presenting of remote MOH media during the hold period if remote MOH media is received in conjunction with the hold period, and
    (b) presenting local MOH media during the hold period, wherein the local MOH media is rendered available prior to the hold period, thereby enabling replacing presenting of the remote MOH media with the locally stored MOH media; and
  means for, if a replacement override condition is determined not to exist, then
    presenting the remote MOH media during the hold period.

23. A machine-readable medium having stored thereon instructions for:
  detecting a hold period during a communication interaction;
  determining whether a replacement override condition exists;
  if a replacement override condition is determined to exist, then
    (a) suppressing presenting of remote MOH media during the hold period if remote MOH media is received in conjunction with the hold period, and
    (b) presenting local MOH media during the hold period, wherein the local MOH media is rendered available prior to the hold period, thereby enabling replacing presenting of the remote MOH media with the locally stored MOH media; and
  if a replacement override condition is determined not to exist, then
    presenting the remote MOH media during the hold period.

* * * * *